(12) United States Patent
Nagashima

(10) Patent No.: US 9,278,698 B2
(45) Date of Patent: Mar. 8, 2016

(54) METHODS AND APPARATUS FOR LIMITING ENGINE SPEED

(71) Applicant: Honda Motor Co., Ltd., Tokyo (JP)

(72) Inventor: Dan Nagashima, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 23 days.

(21) Appl. No.: 14/260,008

(22) Filed: Apr. 23, 2014

(65) Prior Publication Data

US 2015/0306956 A1  Oct. 29, 2015

(51) Int. Cl.
| | |
|---|---|
| *B60W 50/08* | (2012.01) |
| *B60K 26/02* | (2006.01) |
| *F02P 5/15* | (2006.01) |
| *F02D 31/00* | (2006.01) |
| *F02D 37/02* | (2006.01) |
| *B60W 30/188* | (2012.01) |
| *B60W 50/00* | (2006.01) |

(52) U.S. Cl.
CPC .............. *B60W 50/085* (2013.01); *B60K 26/02* (2013.01); *B60W 30/1884* (2013.01); *F02D 31/006* (2013.01); *F02D 31/009* (2013.01); *F02D 37/02* (2013.01); *F02P 5/15* (2013.01); *B60W 2050/0064* (2013.01); *F02D 2200/604* (2013.01)

(58) Field of Classification Search
CPC ....... B60K 26/02; F02D 11/105; F02D 37/02; F02D 31/006; F02D 31/009; F02D 2200/604; B60W 50/085; B60W 30/1884; B60W 2050/0064; F02P 5/15
See application file for complete search history.

(56) References Cited

U.S. PATENT DOCUMENTS

| | | | |
|---|---|---|---|
| 4,751,633 A | 6/1988 | Henn et al. | |
| 5,200,900 A | 4/1993 | Adrain et al. | |
| 5,467,277 A * | 11/1995 | Fujisawa et al. | ................. 701/51 |

(Continued)

FOREIGN PATENT DOCUMENTS

| | | |
|---|---|---|
| EP | 0474493 | 3/1992 |
| EP | 0401155 | 5/1994 |
| WO | WO92/09957 | 6/1992 |

OTHER PUBLICATIONS

"Adjust Your Damping via iPhone or Android Smartphone—Bilstein iRC video," Delta Vee Motorsports LLC, Kalamazoo, MI, Nov. 12, 2013, http://deltavee.net/2013/11/adjust-your-damping-via-iphone-or-android-smartphone-bilstein-irc-video.

(Continued)

*Primary Examiner* — Paul N Dickson
*Assistant Examiner* — Timothy Wilhelm
(74) *Attorney, Agent, or Firm* — Kenealy Vaidya LLP

(57) ABSTRACT

Some embodiments are directed to an apparatus for limiting engine speed using any one of multiple engine components. The apparatus includes a user interface manually actuable to select at least one of the multiple engine components for limiting engine speed. The user interface includes an identification signal generator and transmitter that is configured to, upon selection of the multiple engine component(s), generate and transmit an identification signal that identifies the engine component(s) that was selected. The apparatus also includes a controller that is configured to, upon receipt of the identification signal, provide an instruction to the identified engine component(s), such that the identified engine component(s) operates to limit engine speed upon occurrence of conditions warranting that engine speed be limited.

20 Claims, 3 Drawing Sheets

(56) References Cited

U.S. PATENT DOCUMENTS

| | | | |
|---|---|---|---|
| 5,732,676 | A | 3/1998 | Weisman et al. |
| 5,769,051 | A | 6/1998 | Bayron et al. |
| 5,803,043 | A * | 9/1998 | Bayron et al. ............... 123/335 |
| 5,884,613 | A | 3/1999 | Kitamura et al. |
| 5,995,879 | A | 11/1999 | Ginzel et al. |
| 6,304,814 | B1 * | 10/2001 | Masters et al. ............... 701/110 |
| 6,339,743 | B1 | 1/2002 | Young et al. |
| 6,407,733 | B1 * | 6/2002 | Kawakami ................... 345/204 |
| 6,512,974 | B2 * | 1/2003 | Houston et al. ............... 701/115 |
| 6,539,299 | B2 | 3/2003 | Chatfield et al. |
| 6,542,795 | B2 * | 4/2003 | Obradovich et al. ............. 701/1 |
| 6,560,528 | B1 * | 5/2003 | Gitlin et al. .................. 701/115 |
| 6,721,648 | B2 * | 4/2004 | Masters et al. ............... 701/110 |
| 6,741,925 | B2 | 5/2004 | Masters et al. |
| 6,915,777 | B2 | 7/2005 | Fukushima et al. |
| 6,964,258 | B2 * | 11/2005 | Gudgeon et al. ............. 123/335 |
| 6,994,653 | B2 | 2/2006 | Hartmann et al. |
| 7,017,327 | B2 * | 3/2006 | Hunt et al. .................... 56/14.7 |
| 7,379,801 | B2 * | 5/2008 | Heffington ................... 701/29.6 |
| 7,643,912 | B2 | 1/2010 | Heffington |
| 7,647,138 | B2 | 1/2010 | Heffington |
| 7,987,934 | B2 | 8/2011 | Huseman |
| 8,403,101 | B2 * | 3/2013 | Musser ......................... 180/334 |
| 8,534,397 | B2 * | 9/2013 | Grajkowski et al. ......... 180/54.1 |
| 8,543,295 | B2 * | 9/2013 | Bryant et al. .................. 701/42 |
| 8,833,066 | B2 * | 9/2014 | Renner ........................... 60/431 |
| 2008/0228365 | A1 | 9/2008 | White et al. |
| 2009/0132135 | A1 | 5/2009 | Quinn, Jr. et al. |
| 2010/0017236 | A1 | 1/2010 | Duddle et al. |
| 2012/0123652 | A1 | 5/2012 | Rockwood et al. |
| 2012/0320891 | A1 * | 12/2012 | Moeller ........................ 370/338 |

OTHER PUBLICATIONS

"Choose a Vehicle to See Specific Adjustable Parameters," Website: http://www.diablosport.com/products/intune.html.

"MSD Ignition 8987—MSD Start and Step Timing Contol," JEGS High Performance, downloaded Jan. 30, 2014, http://www.jegs.com/i/MSD-Ignition/121/8987/10002/-1.

"Viper Smart Start Features," Viper 2014, downloaded Jan. 30, 2014, http://www.viper.com/SmartStart/Features.aspx.

"X-WiFi Wideband Air/Fuel UEGO Controller & EGT Monitor," AEM Performance Electronics 2014, downloaded Feb. 24, 2014, http://www.aemelectronics.com/wideband-air-fuel-systems-15/x-wifi-wideband-air-fuel-uego-controller-egt-monitor-34/.

"iOBD2 Diagnostic tool for iPhone," Auto Tool Shop, downloaded Feb. 24, 2014, http://www.auto-tool-shop.com/iobd2-diagnostic-tool-for-iphone-p-443.html.

"Innovate Motorsports Open Tune iPhone System—Speed Shop," Car Craft, Aug. 1, 2010, downloaded Feb. 24, 2014, http://www.carcraft.com/techarticles/ccrp_1008_innovate_motorsports_open_tune_iphone_system/.

"inTune Automotive Handheld Tuner," downloaded Feb. 24, 2014, Website: https://www.diablosport.com/products/intune.html.

Springmann, A., "Hacker rigs car for iPod touch control," PCWorld, Mar. 24, 2010, downloaded Feb. 24, 2014, http://www.macworld.com/article/1150052/ipodtouch_car.html.

"Real Time Engine Tuning with Vivid Linq App," Road&Track, downloaded Feb. 24, 2014, http://www.roadandtrack.com/go/news/new-technology/real-time-engine-tuning-vivid-linq-app-31923.

* cited by examiner

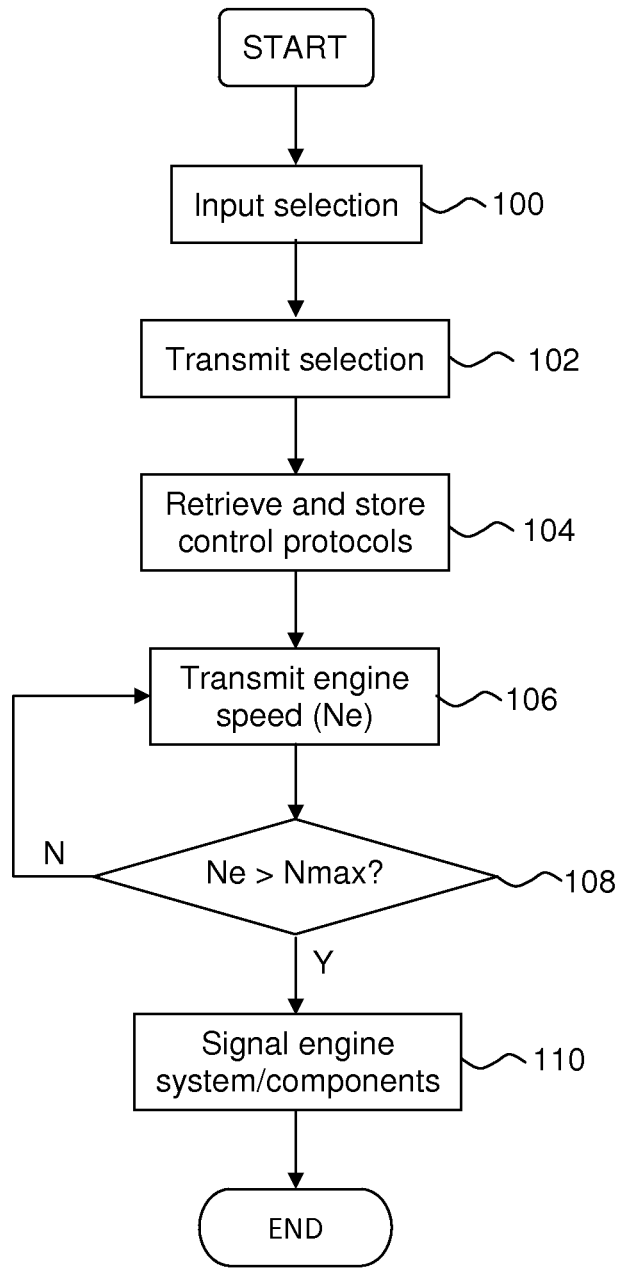

METHODS AND APPARATUS FOR LIMITING ENGINE SPEED

BACKGROUND

The disclosed subject matter relates to methods and apparatus for limiting engine speed, including but not limited to engine speed as measured in terms of revolutions per minute in an automotive/vehicular context. More particularly, the disclosed subject matter relates to limiting the engine speed by controlling at least one of a number of different engine systems or components.

Some related art engines, such as internal combustion engines for powering vehicles, limit engine speed for various reasons. For example, limitations can be placed on engine speed to ensure that the vehicle does not travel faster than a certain maximum speed limit, such as 150 mph. Limiting engine speed may also mitigate or avoid engine damage that could occur due to high reciprocating speeds of various components of the engine, such as but not limited to the valve springs.

SUMMARY

Engine speed can be limited in a variety of ways. For example, fuel injection amount and/or timing can be controlled when the engine speed exceeds a pre-defined limit. Engine speed can also be limited by retarding ignition timing. In particular, ignition timing can be retarded to achieve a set engine speed limit, such as in a closed loop feedback system, or to achieve a pre-defined amount when the engine speed exceeds a pre-defined limit, such as in an open loop feedback system. Engine speed can also be limited by controlling the throttle, such as to a set engine speed limit in a closed loop feedback system, or to a pre-defined amount when engine speed exceeds a pre-defined limit in an open loop feedback system.

Some related art engines and engine systems are configured to enable a user of a vehicle, such as a vehicle operator, driver, etc., to control certain aspects of engine performance. However, the related art fails to provide the user with the ability to control a vehicle in certain ways, for example, in the manner in which engine speed is limited. In other words, the related art fails to empower the user to determine whether the engine speed is to be limited by any one of: controlling fuel injection amount; retarding ignition timing; and controlling throttle; or any combination thereof.

Thus, it may be beneficial to empower a user with that ability, such as by providing methods and apparatus for enabling a user to control, select or otherwise determine the manner in which engine speed is limited, which would become effective upon the occurrence of conditions warranting the limiting of engine speed. In some such embodiments, the user can select or otherwise determine that engine speed is to be limited by at least one of: 1) controlling fuel injection amount and/or timing, 2) retarding ignition timing, and 3) controlling throttle. In other words, the user selects or otherwise determines that engine speed is to be limited by any one of, or any combination of, the above procedures, i.e., any one, any two or all three of these procedures. The engine speed is then limited according to the selected or determined manner(s) or procedure(s) upon the occurrence of conditions warranting the limiting of engine speed. In some of these embodiments, the user is provided with the ability to select the manner in which engine speed is to be limited while the vehicle is being operated, e.g., while the engine is running, while the vehicle is being driven, etc.

Some embodiments are directed to an apparatus for limiting engine speed using multiple engine components, including at least one of a fuel injection system, an ignition system, and a throttle. The apparatus includes a user interface manually actuable to select at least one of the multiple engine components for limiting engine speed. The user interface includes an identification signal generator and transmitter that is configured to, upon selection of the at least one of the multiple engine components, generate and transmit an identification signal that identifies the at least one of the engine components that was selected. The apparatus also includes a controller that is configured to, upon receipt of the identification signal, provide an instruction to the identified at least one of the engine components, such that the identified at least one of the engine components operates to limit engine speed upon occurrence of conditions warranting that engine speed be limited.

Some other of the disclosed embodiments are directed to an engine system for limiting engine speed. The engine system includes multiple engine components usable to limit engine speed, the multiple components including at least one of a fuel injection system, an ignition system, and a throttle. The system includes a user interface manually actuable to select at least one of the multiple engine components for limiting engine speed. The user interface includes an identification signal generator and transmitter that is configured to, upon selection of the at least one of the multiple engine components, generate and transmit an identification signal that identifies the at least one of the engine components that was selected. The system also includes a controller that is configured to, upon receipt of the identification signal, provide an instruction to the identified at least one of the engine components, such that the identified at least one of the engine components operates to limit engine speed upon occurrence of conditions warranting that engine speed be limited.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 5 is a flowchart of an exemplary procedure for selecting the manner of limiting engine speed using the user interface.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

1. Overall Aspects of Engine

Figure 1:
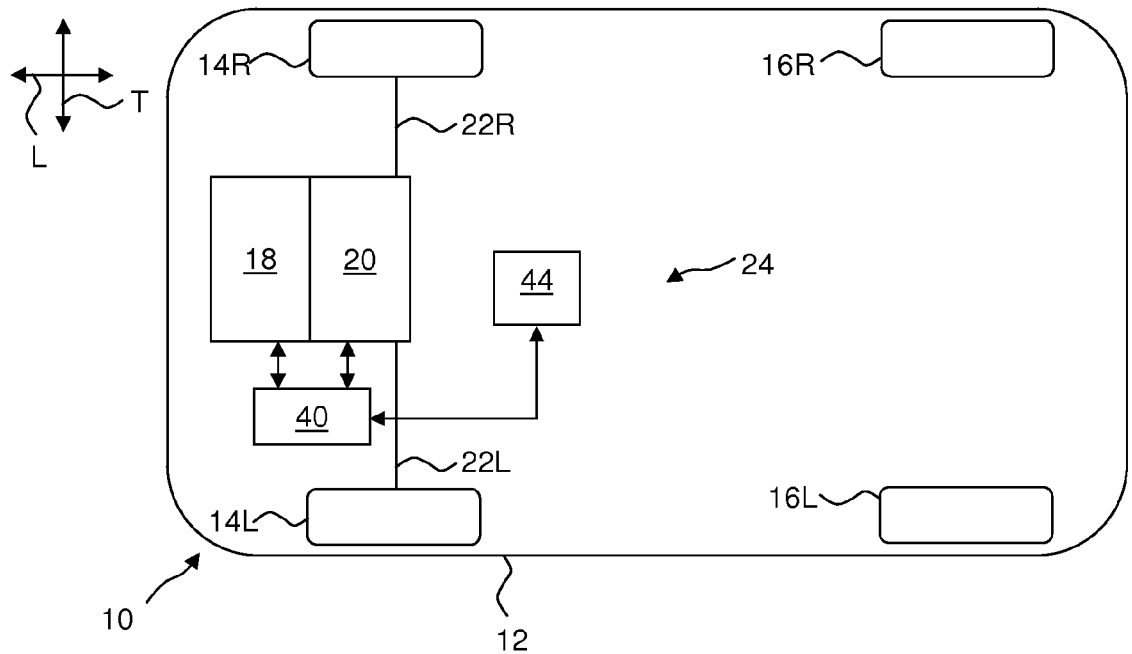
FIG. 1 is a schematic of an exemplary powertrain for a vehicle in accordance with the disclosed subject matter.

FIG. 1 is a schematic of an exemplary powertrain 10 for a vehicle 12 in accordance with principles of the disclosed subject matter. The powertrain 10 and the vehicle 12 are merely provided for exemplary purposes, and the various inventive aspects are intended to be applied to any type of powertrain or vehicle.

The vehicle 12 shown in FIG. 1 includes a pair of front wheels 14L, 14R and a pair of rear wheels 16L, 16R. The powertrain 10 can be configured in various ways to drive the wheels. For example, the powertrain 10 can be configured to only drive the pair of front wheels 14L, 14R, or only the pair of rear wheels 16L, 16R. Alternatively, the powertrain 10 can be configured to drive both pairs of wheels 14L, 14R and 16L, 16R, either in a full-time mode or in a part-time mode. In the full-time mode, the powertrain 10 is configured to always drive both pairs of wheels 14L, 14R and 16L, 16R. Alternatively, in the part-time mode, the powertrain 10 can switch between driving only one of the pairs of wheels and driving both pairs of wheels. This switching can be implemented either manually, or alternatively can be implemented automatically, such as via an on-demand basis where the switching is automatically performed based on available traction at each wheel, vehicle dynamic stability, etc.

The exemplary embodiment shown in FIG. 1 illustrates a front wheel drive powertrain in which the powertrain 10 is configured to only drive the pair of front wheels 14L, 14R. However, as described above, embodiments of the present disclosure are intended to be applied to other powertrain configurations, e.g., rear wheel drive configurations, all-wheel drive configurations, and/or any of the other configurations disclosed above.

The powertrain 10 is shown in FIG. 1 as including an internal combustion engine 18, a transmission 20, a pair of driveshafts 22L 22R, and a control system 24. In general, the transmission 20 transfers or transforms torque from the engine 18 to the driveshafts 22L, 22R, and then to the wheels 14L, 14R. The control system 24 can provide instructions to one or more components of the engine 18 and/or the transmission 20 to affect performance thereof.

Embodiments are intended to be applicable to any type of engine. For example, the engine 18 can be configured as a reciprocating piston engine, a rotary piston engine, hybrid engine, or any other type of engine. In a rotary piston engine, the working chamber can be configured in an epitrochoid shape, and the piston can be configured as a three-lobed rotor. The piston can revolve around an eccentric portion of the crankshaft as the piston moves within the working chamber, so that the cyclic motion of the piston, through the working chamber, is converted into rotary motion of the crankshaft.

The engine 18 can be configured as a compression-ignition engine or as a spark-ignition engine. In a compression-ignition engine ("c-i engine"), the air and fuel mixture ignites when the piston compresses the air and fuel mixture. In a spark-ignition engine ("s-i engine"), the air and fuel mixture ignites when electricity travels across the gap between two electrodes of a spark plug while the piston compresses the air and fuel mixture. However, the various embodiments can be applicable to other types of ignition systems.

Embodiments are applicable to still further engine types and specifications. For example, the c-i engine and s-i engine can be normally aspirated or have forced induction via turbocharger, supercharger, etc.

Figure 2:
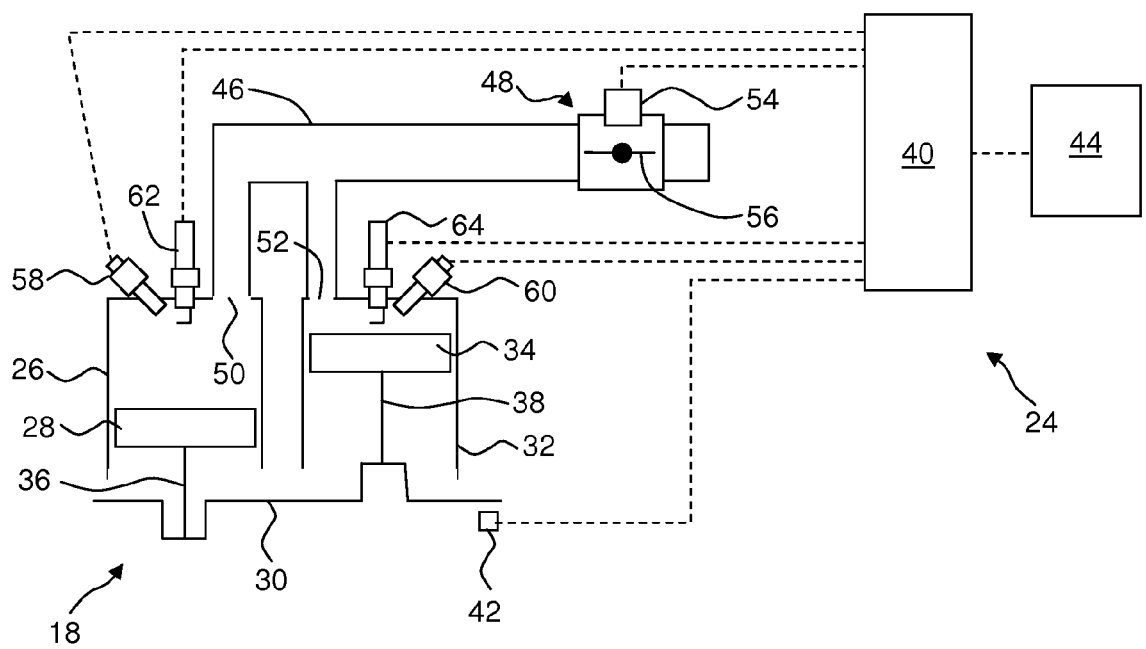
FIG. 2 is a schematic of an exemplary engine and control system in accordance with an embodiment of the disclosed subject matter.

FIG. 2 is a schematic of certain components of the engine 18 and control system 24 in accordance with an exemplary embodiment of the disclosed subject matter. The engine 18 shown in FIG. 2 is a reciprocating piston engine, and can include at least one working chamber 26, at least one piston 28 that moves in the corresponding working chamber 26 in a cyclic manner, and a crankshaft 30 connected to the piston 28 via a connecting rod 36, such that cyclic motion of the piston 28 is converted into rotary motion.

The engine 18 can include any number of working chambers, corresponding pistons, and connecting rods. For example, the engine 18 shown in FIG. 2 includes a second piston 34 disposed in, and movable within, a second working chamber 32. The crankshaft 30 is also connected to the second piston 34 via a second connecting rod 38 so as to convert the cyclic motion of both pistons 28, 34 into rotary motion.

As indicated above, FIG. 2 schematically represents the engine 18 as a reciprocating piston s-i engine that includes two working chambers 26, 32, two pistons 28, 34, two connecting rods 36, 38 and one crankshaft 30, wherein the connecting rods 36, 38 connect the respective pistons 28, 34 to the crankshaft 30. The pistons 28, 34 can move within the respective cylinders 26, 32 in a linear reciprocating motion between a top dead center position ("TDC") and a bottom dead center position ("BDC"). FIG. 2 shows the first piston 28 at BDC and the second piston 34 at TDC.

The control system 24 can be configured to regulate the operation of the engine 18 at variable speeds and torque outputs based on vehicle load and/or one or more ambient or operating conditions. The control system 24 can include elements of an oxygen delivery system, a fuel delivery system, an ignition system (which is omitted from a c-i engine), a controller 40 (which can be referred to as a central processing unit (CPU) or electronic control unit (ECU), an engine speed sensor 42, and a user interface 44.

The engine speed sensor 42 can include any configuration, including known, related art, or later developed technologies. For example, the sensor 42 can include a processor, and thereby be configured to be a smart sensor able to process the raw data collected by the sensor 42 prior to transmission to the controller 40. Alternatively, the sensor 42 can be configured to be a simple sensor that merely transmits the raw data directly to the controller 40 without any manipulation of the raw data. In some embodiments, the sensor 42 is configured to transmit data to the controller 40 without a prompt (such as from the controller 40), while the sensor of other embodiments only transmits the data upon receipt of a prompt.

During operation, the internal combustion engine 18 can be characterized as operating at an engine speed. This engine speed is a measure of the number of complete revolutions per unit of time—where each complete revolution equals 360 degrees of rotation of the crankshaft. Thus, the engine speed can be expressed in units of revolutions per minute.

Due to the cyclic motion of one or more components of the internal combustion engine 18, the engine can have a maximum speed of operation, above which the one or more of the cyclically moving parts can malfunction or become damaged. This maximum engine speed can be referred to as the redline speed.

The engine's speed can be limited to the redline speed by controlling certain engine components. For example, engine speed can be limited by controlling one of the vehicle's fuel delivery system, engine throttle, and ignition system, or any combination of these systems and elements.

Controlling these systems and elements can be performed by certain apparatus that constitute, at least in part, a governor, which can include various elements of the control system 24, including the rotational position or speed sensor (engine speed sensor 42) and controller 40. The engine speed sensor 42 can detect the rotational movement of the crankshaft 30, which thereby provides an indication of engine speed. The controller 40 can be a mechanical control unit that mechanically controls the above systems and elements based on rotational movement of the crankshaft 30, an electronic control unit (ECU) that performs this control electronically, or a hybrid mechanical-electrical control unit. Embodiments are intended to include or otherwise cover any type of governor, sensor, and controller, including known, related art, and/or later developed technologies.

As discussed in detail below, the controller 40 can be configured to automatically limit the engine speed to a speed less than or equal to redline speed. A user interface 44 can be provided in electrical communication with the controller 40, and be configured to permit a user, such as a driver for an operator of the vehicle 12, to instruct the controller 40 to select any one or any combination of the oxygen delivery system (throttle), the fuel delivery system, and the ignition system to limit the engine speed. In some of these embodiments, the engine speed is limited to a speed that is less than or equal to the redline speed. However, other embodiments limit engine speed to other maximum speeds or to accomplish other results.

The three exemplary techniques for limiting engine speed, as well as the control system 24 that allows a user to determine or otherwise select the technique for limiting engine speed, are disclosed in more detail below.

2. Limiting Engine Speed by Controlling Throttle

The oxygen delivery system can regulate the flow of ambient air, including oxygen, into the working chambers 26, 32 (hereinafter "cylinders"). The speed of the engine 18 can be directly proportional to the amount of oxygen present in each of the cylinders 26, 32 prior to the combustion process. In other words, reducing the amount of oxygen at the cylinders 26, 32 generally reduces engine speed, while increasing the amount of oxygen at the cylinders 26, 32 generally increases engine speed. As a result, the engine speed can be limited to a speed less than or equal to a certain speed, such as the redline speed, by controlling the oxygen delivery system to reduce the amount of oxygen delivered to each of the cylinders 26, 32.

Various components of the oxygen delivery system are shown in FIG. 2. The oxygen delivery system can include an intake manifold 46, a throttle body 48 and an intake valve assembly. The intake manifold 46 can be in fluid communication with the ambient environment, and can provide a fluid passage for ambient air to pass into the cylinders 26, 32 via respective intake ports 50, 52 formed in the engine 18.

The throttle body 48 can include an actuator 54 and a valve member 56, which can be pivoted by the actuator 54 to any position between: 1) a fully closed position where the valve member 56 closes fluid communication through the intake manifold 46, and 2) a fully opened position where the valve member 56 permits the flow of ambient air to pass through the intake manifold 46, substantially unrestricted by the valve member 56.

FIG. 2 illustrates the valve member 56 in the fully opened position. In the fully closed position, the valve member 56 is substantially perpendicular to the fully closed position and can span the width of the intake manifold 46. The actuator 54 can be an electric motor mechanically connected to the valve member 56 to move the valve member 56 between the fully opened position and fully closed position. In some embodiments, the valve member 56 is configured as a butterfly valve.

The intake valve assembly (not shown) can be configured to selectively and independently open and close fluid communication between each intake port 50, 52 and the respective cylinder 26, 32. The intake valve assembly can include at least one valve member per cylinder, a biasing member for each valve member, and at least one cam shaft that includes at least one cam.

Embodiments are intended to include or otherwise cover various different forms of the above elements. For example, the valve member can be configured as a poppet valve. The biasing member can be configured as a coil spring that can bias the poppet valve into a closed position, such that the poppet valve closes fluid communication between the intake manifold and the respective cylinder port. Each cam can be configured to rotate with the camshaft, and to engage, directly or indirectly, a respective poppet valve to move the poppet valve from the closed position to an open position, such that the poppet valve can open fluid communication between the intake manifold 42 and respective intake port (e.g., the first intake port 50 or the second intake port 52).

Embodiments are intended to include or otherwise cover any type of oxygen delivery system, including known, related art, and/or later developed technologies. For example, embodiments are intended to include or otherwise cover any apparatus or method for controlling the amount of oxygen to the cylinders 26, 32, including but not limited to various different configurations of the valve member 56.

In some embodiments, and as discussed in more detail below, the control system 24 controls the valve member 56 to control the amount of oxygen provided to the cylinders 26, 32. In one such embodiment, when the controller 40 receives data from the engine speed sensor 42 indicative of a speed that is within a predetermined range of the redline speed (or some other determined maximum speed), the controller 40 can signal the actuator 54 to move the valve member 56 toward the fully closed position by an amount that will reduce the oxygen supply to the cylinders 26, 32 so that the engine speed is reduced by an appropriate amount.

3. Limiting Engine Speed by Controlling Fuel Injection

The fuel delivery system can regulate the flow of fuel into the cylinders 26, 32. The speed of the engine 18 can also be directly proportional to the amount of fuel present in each cylinder 26 or 32 prior to the combustion process. In other words, reducing the amount of fuel at the cylinders 26, 32 generally reduces the engine speed, while increasing the amount of fuel at the cylinders 26, 32 generally increases the engine speed. As a result, the engine speed can be limited to a speed less than or equal to a certain speed, such as the redline speed, by controlling the fuel delivery system to reduce the amount of fuel delivered to each of the cylinders 26, 32.

The fuel delivery system can include a fuel tank and fuel pump (not shown), as well as a fuel injector. In fact, fuel delivery systems of both c-i engines and s-i engines can include at least one fuel injector. The fuel injector can include a flow control valve that can be selectively opened and closed to control the amount of fuel that exits the fuel injector for delivery to the cylinders 26, 32.

The exemplary embodiment of FIG. 2 illustrates two fuel injectors 58, 60—one for each of the cylinders 26, 32 arranged in a direct injection configuration where the fuel injectors 58, 60 can spray fuel directly into the respective one of the cylinders 26, 32. In another exemplary embodiment, each fuel injector 58, 60 can be positioned to spray fuel into a respective portion of the intake manifold 46 that is in fluid communication with a respective one of the intake ports 50, 52. In yet another exemplary embodiment, a single fuel injector can be located downstream of the throttle body 48, such as immediately adjacent thereto, in order to deliver fuel to each of the cylinders 26, 32.

Embodiments are intended to include or otherwise cover any type of fuel delivery system, including known, related art, and/or later developed technologies. For example, embodiments are intended to include or otherwise cover any methods or apparatus for controlling the amount of fuel to the cylinders 26, 32, including various different configurations of the fuel injectors 58, 60. In some such embodiments, the fuel injectors can each include a fuel injector valve to regulate the flow of fuel to the cylinders 26, 32.

In some embodiments, and as discussed in more detail below, the control system 24 controls the fuel injectors 58, 60 to control the amount of fuel provided to the cylinders 26, 32, as well as the timing of the fuel delivered. In one such embodiment, the fuel injectors 58, 60 are in electrical communication with the controller 40, which can be configured to independently instruct each of the fuel injectors 58, 60 to meter a specific amount of fuel for delivery into the respective one of the cylinders 26, 32. The controller 40 can be configured to independently instruct each of the fuel injectors 58, 60 to deliver fuel into the respective one of the cylinders 26, 32 at a specific timing. The timing of the fuel delivery and amount of fuel delivered can be based on piston position, such as the pistons being disposed at TDC. In particular, the timing and duration of the opening of the fuel injector valve can vary relative to the pistons' TDC.

In accordance with some embodiments, when the controller 40 receives data from the engine speed sensor 42 indicative of a speed that is within a predetermined range of the redline speed (or some other determined maximum speed), the controller 40 can signal the fuel injectors 58, 60 to meter an amount of fuel to the cylinders 26, 32 sufficient to reduce the engine speed by an appropriate amount.

In alternative embodiments, the controller 40 can be configured to signal the fuel injectors 58, 60 to retard the timing of the injection of fuel so that the fuel is sprayed into the cylinders at a predetermined time after the respective one of the pistons 28, 34 has reached TDC. During operation at higher engine speeds, the duration of the combustion of fuel is reduced as compared to lower engine speeds because the piston travels from TDC to BDC at a higher speed. This retarded injection timing further reduces the time available for the combustion process. As a result, less fuel can be burned during the power stroke of the piston resulting in a reduction of the engine speed.

Embodiments are intended to include or otherwise cover various different forms of the above elements. For example, the fuel supply system can include one or more carburetors in place of the fuel injectors.

4. Limiting Engine Speed by Retarding Ignition Timing

In s-i internal combustion engines, combustion of the air and fuel mixture is initiated by providing electrical energy to each of the cylinders 26, 32, such as via an ignition system. The ignition system can be configured to regulate the electrical energy that is provided to each of the cylinders 26, 32.

The ignition system can include an electrical power supply (such as a battery, not shown), and at least one spark plug in communication with a respective one of the cylinders 26, 32. The exemplary embodiment of FIG. 2 illustrates two spark plugs 62, 64—one for each of the cylinders 26, 32.

During operation at higher engine speeds, the duration of the combustion of fuel is reduced as compared to lower engine speeds because the piston travels from TDC to BDC at a higher speed. If the timing of the firing of each of the spark plugs 62, 64 (relative to the timing at which the piston is at TDC) is not adjusted relative to lower engine speeds, then less fuel can be burned during the power stroke of the piston because the duration of the power stroke is less at higher engine speeds as compared to lower engine speeds.

As a result, the controller 40 can be configured to control the spark plugs 62, 64 to address the above issues, such as by advancing the timing of the firing of the spark plugs 62, 64 so that the air and fuel mixture is ignited before the piston reaches TDC. Conversely, in order to reduce engine speed, the controller 40 can be configured to instruct the spark plugs 62, 64 to fire at a timing subsequent to the respective one of the pistons 28, 34 reaching TDC, thus further reducing the time for combustion during the power stroke of the pistons 28, 34.

Embodiments are intended to include or otherwise cover any type of apparatus for regulating timing of the ignition, including known, related art, and/or later developed technologies. For example, embodiments are intended to include or otherwise cover any methods or apparatus for controlling the timing of the firing of the spark plugs 62, 64 to affect engine speed.

5. User Operated Control System

Certain embodiments enable a user to control or otherwise determine the procedure or manner in which engine speed is to be limited, such as by enabling the user to determine that engine speed is to be limited by virtue of one or any combination of the engine limiting procedures disclosed above, including but not limited to: 1) controlling fuel injection amount, 2) retarding ignition timing, and 3) controlling throttle. In other words, the user is empowered to select the procedure(s) or manner(s) in which the engine speed is to be limited, such that the engine speed is then limited according to the selected or determined manner(s) or procedure(s) upon the occurrence of conditions warranting the limiting of engine speed. In some of these embodiments, the user is provided with the ability to select the manner in which engine speed is to be limited while the vehicle is being operated, e.g., while the engine is running, while the vehicle is being driven, etc.

Embodiments are intended to include or otherwise cover any methods and apparatus for enabling the user to perform this operation. Some of the embodiments disclosed below utilize a user operated button, switch, touch screen display, combination of mouse and display, mobile device application, etc. However, embodiments are not restricted to any specific structure or apparatus to enable the user to select the manner in which engine speed is to be limited.

In accordance with some embodiments, the user operates the user interface 44 to select the manner in which engine speed is to be limited. In some of these embodiments, the user interface 44 communicates the user's selection to the controller 40, which then limits engine speed accordingly upon the existence of conditions warranting the limitation of engine speed. For example, the user interface can include an identification signal generator and transmitter that generates and transmits an identification signal that identifies the user's selection to the controller.

In accordance with some embodiments, the user interface 44 is constituted by a dedicated physical switch that enables the user to select the manner in which engine speed is to be limited. However, the user interface 44 of other embodiments is not a dedicated switch, and instead is constituted by a physical switch that provides other or additional functionalities.

In accordance with one physical switch configuration, a separate position is provided for each of the separate procedures for limiting engine speed. Thus, a separate switch position is provided for each of: 1) fuel injection amount; 2) ignition timing; and 3) throttle. Thus, engine speed is limited based on the selected switch position upon the occurrence of conditions warranting that the engine speed is limited. In accordance with this switch configuration, the user interface 44 only permits engine speed to be limited based on one selected procedure.

In accordance with a different physical switch configuration, each of the three switch positions includes a separate actuator to activate or deactivate the corresponding procedure for limiting engine speed. In other words, each of the separate switch positions (1) fuel injection amount; 2) ignition timing; and 3) throttle) includes a separate actuator enabling selection of the corresponding procedure. Thus, engine speed is limited based on separate actuation of each of the switch positions, which enables the user to limit engine speed based on any combination of the procedures for limiting engine speed.

Alternatively, the user interface 44 can be in the form of a display, such as at the vehicle dashboard (i.e., instrument panel) or other location. In accordance with some of these embodiments, the user interface 44 is constituted as a touchscreen display that enables the user to select any one or any combination of the procedures for limiting engine speed. In accordance with other of these embodiments, instead of a touchscreen display, the user interface 44 is constituted by a display and other apparatus that enables the user to toggle through the displayed different procedures for limiting engine speed. For example, the display can be provided on the dashboard, and a mouse can be provided at a convenient location for the user to operate.

As yet another alternative, the user interface 44 can be constituted by a processor that is separate from the standard vehicle control system. For example, the user interface 44 can include, at least in part, a mobile device, such as a smart phone, tablet computer, etc. In some of these embodiments, an application on the mobile device can enable the user to select the procedure for limiting engine speed, and then transmit the selected procedure to the controller 40.

This transmission of the selected procedure for limiting engine speed can be performed in accordance with any known, related art, or later developed technologies. For example, the transmission can be performed wires, wirelessly, via a network, etc.

Figure 3:
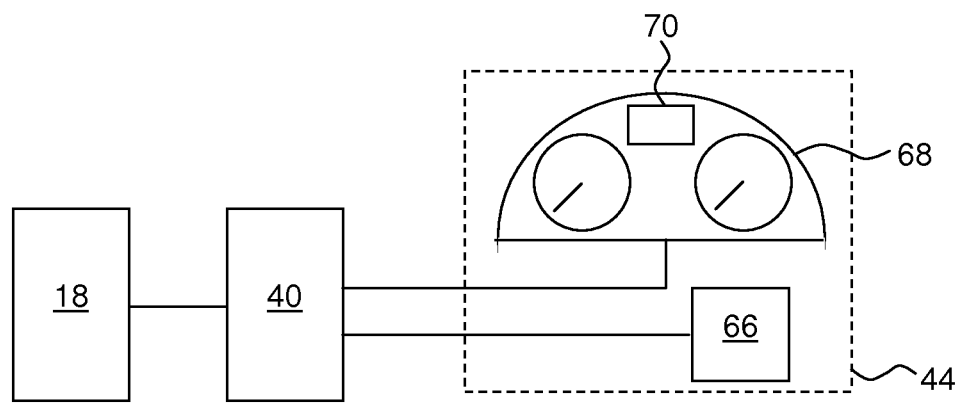
FIG. 3 is a schematic of an exemplary engine, controller and user interface in accordance with the disclosed subject matter.

FIG. 3 is a schematic of an exemplary engine, controller and user interface in accordance with the disclosed subject matter. As shown in FIG. 3, the user selects the manner in which engine speed is to be limited via the user interface 44, which transmits the corresponding selection to the controller 40. The controller 40 then limits engine speed at the appropriate time based on the corresponding selection. In other words, the controller 40 controls the appropriate components of the engine 18 based on the corresponding selection.

In the embodiment of FIG. 3, the user interface 44 includes a switch 66 and a display area 70 located in an instrument cluster 68. This configuration of the user interface 44 may be especially beneficial because it provides the user with easy and convenient access to selecting the manner in which engine speed is to be limited. The instrument cluster 68 can include gauges/meters indicating vehicle speed, engine speed, engine temperature, fuel level, etc.

Embodiments are intended to include or otherwise cover various different forms of the above elements. For example, the switch 66 can be in the form of a button, a rotary knob, a slider, a haptic sensor, etc., and can be placed anywhere in the vehicle within reach of the driver, such as but not limited to the gear selector, the steering wheel, the instrument panel, and the center console.

Figure 4:
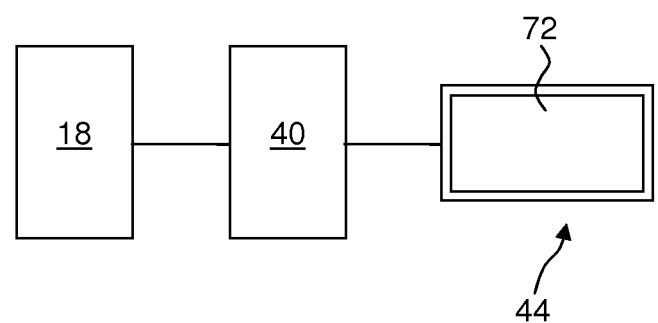
FIG. 4 is a schematic of an exemplary engine, controller and alternative user interface in accordance with the disclosed subject matter.

FIG. 4 is a schematic of an exemplary engine, controller and alternative user interface in accordance with the disclosed subject matter. The user interface 44 of FIG. 4 is an alternative to the user interface 44 of FIG. 3. In this exemplary embodiment, the user interface can include a touch screen display 72. The touch screen display 72 can be configured to permit the user to select which system(s) regulates the maximum engine speed and to display the selected system(s).

In the embodiment shown in FIG. 4, the user interface 44 is provided adjacent the instrument cluster or along the center console. This configuration may be especially beneficial because more space is available in these areas to provide additional functionality, including but not limited to enabling the user to select any combination of procedures for limiting engine speed, instead of only being able to select a single procedure for limiting engine speed. This procedure may also be beneficial based on its proximity to the gauges/meters that indicate engine speed. For example, providing the user interface 44 at this location may be more intuitive for many users, thereby enabling the users to more easily locate the user interface 44.

The user interfaces 44 are merely provided in FIGS. 3 and 4 for exemplary purposes. As indicated above, embodiments are intended to include or otherwise cover any and all apparatus for enabling a user to select the manner in which engine speed is to be limited.

FIG. 5 is a flowchart of an exemplary procedure for selecting the manner of limiting engine speed using the user interface. This flowchart is merely provided for exemplary purposes, and embodiments are intended to include or otherwise cover any methods or procedures for enabling a user to select the manner in which engine speed is to be limited.

In accordance with the flowchart of FIG. 5, the user manually selects the manner in which engine speed is to be limited using the user interface 44 at step 100. At step 102, the user interface 44 transmits the selected manner for limiting engine speed to the controller 40. Upon receipt, the controller 40 stores or otherwise selects control protocols for limiting engine speed that correspond to the selected manner for limiting engine speed at step 104.

At step 106, the engine speed sensor 42 senses engine speed and transmits the sensed engine speed to the controller 40. The controller 40 then determines whether the sensed engine speed exceeds the preset maximum engine speed at step 108. If not, i.e., the sensed engine speed does not exceed a pre-set maximum engine speed, then the process reverts to step 106. If so, then the process proceeds to step 110, where the controller 40 transmits the stored control protocols (for limiting engine speed corresponding to the selected matter of limiting engine speed) to the appropriate engine system/components.

After the controller 40 transmits the stored control protocols to the appropriate engine system/components, the procedure can either re-start at the beginning or alternatively revert to a certain step, such as step 106. However, in accordance with some embodiments, the procedure delays this re-starting or reverting for a predetermined period to enable the appropriate engine speed procedures to take effect.

6. Other Engine Systems and Embodiments

While certain embodiments of the invention are described above, and FIGS. 1-5 disclose the best mode for practicing the various inventive aspects, it should be understood that the invention can be embodied and configured in many different ways without departing from the spirit and scope of the invention.

For example, embodiments are disclosed above in the context of an internal combustion engine. However, embodiments are also applicable to other types of engines, including but not limited to hybrid engines. In other words, in some embodiments, the internal combustion engine 18 disclosed above can be combined with an electric motor to form a hybrid power source. In some of these embodiments, the engine output axis of the engine 18 or the hybrid power source is oriented in the longitudinal direction L, or in the traverse direction T, of the vehicle. The engine 18 can be mounted forward of the front axles, rearward of the rear axles, or intermediate the front and rear axles. In the exemplary embodiment of FIG. 1, the engine 18 is configured as an traversely-oriented front-mounted engine, however as indicated above, embodiments are applicable to any other type or configuration of engine.

Enabling a user to select the manner in which speed is to be limited may be especially beneficial for vehicles having manual transmissions because of the higher likelihood of over-revving. However, embodiments are intended to be applicable to vehicles having any type of transmission. For example, the transmission 14 can be an automatic transmission, a manual transmission, or a semi-automatic transmission. The transmission 14 can include a speed ratio assembly, which can be a stepped speed ratio assembly or a continuously variable speed ratio assembly. However, as indicated above, embodiments are intended to be applicable to vehicles having any other type or configuration of transmission.

The controller 40 can control the operation of various of the components disclosed above, such as the engine 18, the transmission 20, the actuator 54, the fuel injectors 58, 60, and the spark plugs 62, 64. In addition, the controller 40 can receive data from, or otherwise communicate with, various components, such as the engine speed sensor 42 and user interface 44. Embodiments are intended to include or otherwise cover any type of apparatus for effecting this control, reception of data, or otherwise enabling communication. In some embodiments, this apparatus includes electrical communication lines, such as in the form of wires, to facilitate electrical communication. However, in other embodiments, the electrical communication is performed wirelessly. Electrical communication can be either one-way communication or two-way communication, and can be networked or not networked.

Exemplary embodiments are intended to cover all software or computer programs capable of performing the various heretofore-disclosed determinations, calculations, etc., for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages. Some of the disclosed embodiments include or otherwise involve data transfer over a network, such as communicating various inputs over the network. The network may include; for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include; for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. An apparatus for limiting engine speed using multiple engine components, including a fuel injection system, an ignition system, and a throttle, the apparatus comprising:
   a user interface that includes a fuel injection system option, an ignition system option, and a throttle option, the user interface is manually actuable to select at least one of the fuel injection system option, the ignition system option, and the throttle option for limiting engine speed via the respective one of the fuel injection system, the ignition system, and the throttle, the user interface including an identification signal generator and transmitter that is configured to, upon selection of the at least one of the fuel injection system option, the ignition system option, and the throttle option, generate and transmit an identification signal that identifies the at least one of the engine components that was selected; and
   a controller that is configured to, upon receipt of the identification signal, provide an instruction to the identified at least one of the engine components, such that the identified at least one of the engine components operates to limit engine speed upon occurrence of conditions warranting that engine speed be limited.

2. The apparatus according to claim 1, further comprising:
   an engine speed sensor that senses and transmits engine speed to the controller, such that the controller determines whether conditions have arisen that warrant limitation of engine speed based on the sensed engine speed.

3. The apparatus according to claim 1, wherein the user interface is configured to enable the manual selection of any one of, or any combination of, the fuel injection system, the ignition system, and the throttle to limit engine speed.

4. The apparatus according to claim 1, wherein the user interface is disposed adjacent components for actuating shifting gears of the vehicle.

5. The apparatus according to claim 1, wherein the user interface is disposed adjacent a gauge/meter indicating engine speed.

6. The apparatus according to claim 1, wherein the user interface includes a touch screen display.

7. The apparatus according to claim 1, wherein the user interface includes a display, and a manually operated switch that enables selection of the at least one of the engine components for limiting engine speed.

8. The apparatus according to claim 1, wherein the user interface includes a processor that is separate from a standard vehicle control system.

9. The apparatus according to claim 8, wherein the processor is a mobile device, such that the user is able to access an application of the mobile device to manually select at least one of the multiple engine components for limiting engine speed.

10. The apparatus according to claim 9, wherein the mobile device transmits the identification signal wirelessly to the controller.

11. An engine system for limiting engine speed, comprising:
multiple engine components usable to limit engine speed, the multiple components including a fuel injection system, an ignition system, and a throttle;
a user interface that includes a fuel injection system option, an ignition system option, and a throttle option, the user interface is manually actuable to select at least one of the fuel injection system option, the ignition system option, and the throttle option for limiting engine speed via the respective one of the fuel injection system the ignition system, and the throttle, the user interface including an identification signal generator and transmitter that is configured to, upon selection of the at least one of the fuel injection system option, the ignition system option, and the throttle option, generate and transmit an identification signal that identifies the at least one of the engine components that was selected; and
a controller that is configured to, upon receipt of the identification signal, provide an instruction to the identified at least one of the engine components, such that the identified at least one of the engine components operates to limit engine speed upon occurrence of conditions warranting that engine speed be limited.

12. The system according to claim 11, further comprising:
an engine speed sensor that senses and transmits engine speed to the controller, such that the controller determines whether conditions have arisen that warrant limitation of engine speed based on the sensed engine speed.

13. The system according to claim 11, wherein the user interface is configured to enable the manual selection of any one of, or any combination of, the fuel injection system, the ignition system, and the throttle to limit engine speed.

14. The system according to claim 11, wherein the user interface is disposed adjacent components for actuating shifting gears of the vehicle.

15. The system according to claim 11, wherein the user interface is disposed adjacent a gauge/meter indicating engine speed.

16. The system according to claim 11, wherein the user interface includes a touch screen display.

17. The system according to claim 11, wherein the user interface includes a display, and a manually operated switch that enables selection of the at least one of the engine components for limiting engine speed.

18. The system according to claim 11, wherein the user interface includes a processor that is separate from a standard vehicle control system.

19. The system according to claim 18, wherein the processor is a mobile device, such that the user is able to access an application of the mobile device to manually select at least one of the multiple engine components for limiting engine speed.

20. A method for limiting engine speed using multiple engine components, including a fuel injection system, an ignition system, and a throttle, the method comprising:
providing a user with an ability to select each of the multiple engine components in order to limit engine speed;
generating and transmitting, upon selection of the at least one of the multiple engine components, an identification signal that identifies the at least one of the engine components that has been selected; and
providing, upon receipt of the identification signal, an instruction to the identified at least one of the engine components, such that the identified at least one of the engine components operates to limit engine speed upon occurrence of conditions warranting that engine speed be limited.

* * * * *